United States Patent
Factor et al.

(10) Patent No.: US 9,824,231 B2
(45) Date of Patent: Nov. 21, 2017

(54) RETENTION MANAGEMENT IN A FACILITY WITH MULTIPLE TRUST ZONES AND ENCRYPTION BASED SECURE DELETION

(71) Applicant: International Business Machines Corporation, Armonk, NY (US)

(72) Inventors: Michael Factor, Haifa (IL); Daivid Lebutsch, Tuebingen (DE); Alexandra Shulman-Peleg, Givataim (IL); Tim Waizenegger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 14/582,220

(22) Filed: Dec. 24, 2014

(65) Prior Publication Data

US 2016/0188894 A1    Jun. 30, 2016

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/602* (2013.01); *H04L 9/0861* (2013.01); *H04L 63/108* (2013.01); *G06F 2221/2137* (2013.01)

(58) Field of Classification Search
CPC . G06F 21/602; G06F 21/6218; H04L 9/0861; H04L 63/108
See application file for complete search history.

(56) References Cited

U.S. PATENT DOCUMENTS

2007/0220277 A1    9/2007    Osaki
2008/0168135 A1*   7/2008    Redlich .................. G06Q 10/10
                                                     709/204
(Continued)

FOREIGN PATENT DOCUMENTS

WO    2011070606    6/2011

OTHER PUBLICATIONS

Sarah M Diesburg, "A Survey of Confidential Data Storage and Deletion Methods", Journal ACM Computing Surveys, vol. 43 Issue 1, Article No. 2 ,Nov. 2010.
(Continued)

*Primary Examiner* — Jeffrey Pwu
*Assistant Examiner* — Thong Truong
(74) *Attorney, Agent, or Firm* — Daniel Kligler

(57) ABSTRACT

A computing facility, including a storage management system belonging to a first trust zone having a first privilege level, a metadata management system belonging to a second trust zone having a second privilege level higher than the first privilege level, and a security management system belonging to a third trust zone having a third privilege level higher than or equal to the second privilege level. The storage management system is and configured to store multiple content entities, and the metadata management system is configured to manage, for each of the multiple content entities, metadata including a respective content encryption key and a respective retention time, each of the content entities being encrypted by its respective content encryption key. The security management system is configured to manage a master encryption key used to create the respective content encryption keys, and to confirm expiration of the respective retention times.

14 Claims, 4 Drawing Sheets

(51) Int. Cl.
*H04L 9/08* (2006.01)
*G06F 21/60* (2013.01)
*H04L 29/06* (2006.01)

(56) References Cited

U.S. PATENT DOCUMENTS

| | | |
|---|---|---|
| 2011/0055559 A1* | 3/2011 | Li .................. G06F 21/6218 713/165 |
| 2014/0006802 A1 | 1/2014 | Cachin et al. |
| 2014/0068277 A1 | 3/2014 | Metzger |

OTHER PUBLICATIONS

Nikolai Joukov, "Secure deletion myths, issues, and solutions", StorageSS '06 Proceedings of the second ACM on workshop on Storage security and survivability pp. 61-66, 2006.
J. Li, S. Singhal., "Managing Data Retention Policies at Scale", Network and Service Management, IEEE Transactions on (vol. 9 , Issue: 4 ), pp. 393-406, Dec. 10, 2012.

* cited by examiner

RETENTION MANAGEMENT IN A FACILITY WITH MULTIPLE TRUST ZONES AND ENCRYPTION BASED SECURE DELETION

FIELD OF THE INVENTION

The present invention relates generally to distributed system management, and specifically to managing files stored in a distributed environment that comprises distributed systems in multiple trust zones.

BACKGROUND

Retention time mechanisms enable special requirements to be set in order to prevent a file from being deleted prior to a pre-defined date. One implementation of a retention time mechanism is a secure deletion mechanism that uses an encryption key to encrypt a file's data, thereby enabling unrecoverable erasure of the data by deleting the encryption key. By erasing the encryption key (i.e., on or after the pre-defined date), the file becomes inaccessible in a manner that does not provide a restoration option.

The description above is presented as a general overview of related art in this field and should not be construed as an admission that any of the information it contains constitutes prior art against the present patent application.

SUMMARY

There is provided, in accordance with an embodiment of the present invention a computing facility, including a storage management system belonging to a first trust zone having a first privilege level and configured to store multiple content entities, a metadata management system belonging to a second trust zone having a second privilege level higher than the first privilege level and configured to manage, for each of the multiple content entities, metadata including a respective content encryption key and a respective retention time, each of the content entities being encrypted by its respective content encryption key, and a security management system belonging to a third trust zone having a third privilege level higher than or equal to the second privilege level and configured to manage a master encryption key used to create the respective content encryption keys, and to confirm expiration of the respective retention times.

There is also provided, in accordance with an embodiment of the present invention a method, including storing, by a storage management system belonging to a first trust zone having a first privilege level, multiple data entities, for each of the multiple data entities, managing, by a metadata management system belonging to a second trust zone having a second privilege level higher than the first privilege level, metadata including a respective file encryption key and a respective retention time, each of the data entities being encrypted by its respective encryption key, managing, by a security management system belonging to a third trust zone having a third privilege level higher than or equal to the second privilege level, a master encryption key used to create the respective file encryption keys, and confirming, by the security management system, expiration of the respective retention times.

There is further provided, in accordance with an embodiment of the present invention a computer program product, the computer program product including a non-transitory computer readable storage medium having computer readable program code embodied therewith, the computer readable program code including computer readable program code configured to store, by a storage management system belonging to a first trust zone having a first privilege level, multiple data entities, computer readable program code configured, for each of the multiple data entities, to manage, by a metadata management system belonging to a second trust zone having a second privilege level higher than the first privilege level, metadata including a respective file encryption key and a respective retention time, each of the data entities being encrypted by its respective encryption key, computer readable program code configured to manage, by a security management system belonging to a third trust zone having a third privilege level higher than or equal to the second privilege level, a master encryption key used to create the respective file encryption keys, and computer readable program code configured to confirm, by the security management system, expiration of the respective retention times.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
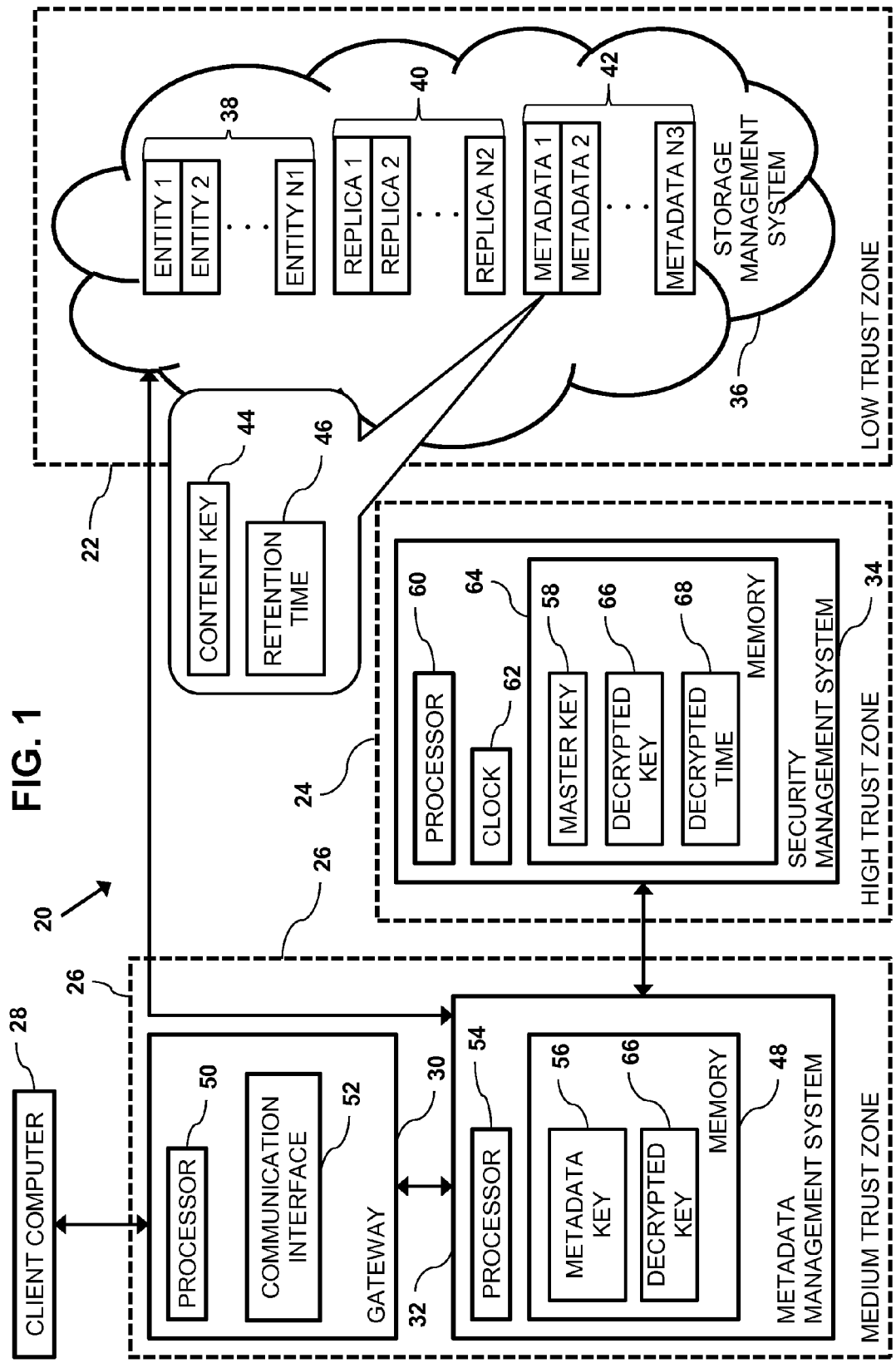
FIG. 1 is a block diagram of a computer facility having multiple trust zones, in accordance with an embodiment of the present invention.

Large scale computer systems such as enterprise networks may comprise multiple trust zones. A trust zone comprises a set of resources (e.g., computer systems and networks) that are subject to a shared security policy having rules governing access to data and services with the trust zone. For example, a trust zone may be set up between different network segments that require specific usage policies based on information processed (e.g., corporate legal and financial information).

In some configurations, the resources in each trust zone may have different privileges. For example if a computer system comprises a first network segment having a first trust zone, and a second network segment having a second trust zone having a higher privilege level than the first trust zone, the resources in the second network segment may have unrestricted access to all the resources in the first network segment, while the resources in the first network segment will typically have restricted (or no) access to the resources in the second network segment.

Embodiments of the present invention describe a computing facility configured to protect encryption keys (used for secure deletion) from being erased prior to expiration of their respective retention times. In embodiments described herein, an encryption key can be used to access encrypted data in the computing facility, and the encrypted data can be deleted from the computing facility by deleting the encryption key.

In some embodiments, the computing facility comprises a storage management system configured to store and manage multiple content entities (e.g., files), a metadata management system configured to manage, for each of the content entities, metadata comprising a respective content encryption key and a respective retention time. In operation, each of the content entities can be encrypted using its respective content encryption key. The computing facility also comprises a security management system configured to manage a master encryption key used to create the respective content encryption keys, and to confirm expiration of the respective retention times.

As described hereinbelow, the storage management system belongs to a first trust zone having a first privilege level, the metadata management system belongs to a second trust zone having a second privilege level higher than the first privilege level, and the security management system belongs to a third trust zone having a third privilege level higher than or equal to the second privilege level. In some embodiments, the security management system may comprise an internal clock that is "tamper-proof" (i.e., since the security management system is included in the third trust zone) and be configured to securely validate expiration of retention times.

By securely distributing data and metadata, systems implementing embodiments of the present invention can help prevent performance bottlenecks. Additionally, by including the metadata management system and the security management system in higher trust zones, data loss can be reduced by preventing attacks to expose the data or the encryption keys on the storage management system, and preventing attacks on the internal clock.

Furthermore, as described hereinbelow, the storage management system can be configured to store, for backup and resiliency purposes, redundant replicas of primary copies of data, thereby providing (a) monitoring and auditing capabilities allowing detection of data retention violations, and (b) self-healing behavior that can restore data and re-heal the system if a system component is compromised.

System Description

FIG. 1 is a block diagram of a computer facility 20 having multiple trust zones 22, 24 and 26, in accordance with an embodiment of the present invention. In embodiments of the present invention, trust zone 22 comprises a low trust zone, trust zone 24 comprises a medium trust zone that is higher than trust zone 24, and trust zone 26 comprises a high trust zone that is higher than, or equal to trust zone 26. In other words, in facility 20, devices in trust zone 26 have a higher privilege level than devices in trust zone 22, and devices in trust zone 28 have an identical or a higher privilege level than devices in trust zone 26.

Facility 20 comprises a client computer 28, a gateway 30 and a metadata management system 32 in trust zone 26, a security management system 34 in trust zone 24, and a storage management system 36 in trust zone 22. In some embodiments, zones 22, 24 and 26 may comprise different physical locations. While the configuration in FIG. 1 shows gateway 30 and metadata management system 32 as separate computer systems, other configurations are considered to be within the spirit and scope of the present invention. For example, the functionalities of gateway 30 and metadata management system 32 can be implemented within a single computer system. In some embodiments, gateway 30 and metadata management system 32 can be implemented as separate virtual machines on a single computer system.

While the configuration in FIG. 1 shows metadata management system 32 as a single system, the metadata management server can be split (i.e., distributed) into multiple sub-systems. For example metadata management system 32 may comprise a first sub-system that is co-located with security management system 34 and is configured to perform operations on sensitive data and attributes, and a second sub-system that is co-located with storage management system 36 in a non-trusted zone, and configured to performing less sensitive operations such as asynchronously uploading data to a cloud infrastructure (e.g., storage management system 36). In additional embodiments, metadata management system 32 can be located in the same trust zone as security management system 34 (e.g. at a customer's premises). In further embodiments, systems 32, 34 and 36 may be implemented as virtual machines.

In the configuration shown in FIG. 1, storage management system 36 comprises a cloud-based distributed storage system configured to store content entities 38, replicas 40 and metadata entries 42. In an alternative embodiment, metadata entries 42 may be stored in a memory 48 of metadata management system 32. While the example presented in FIG. 1 shows a storage management system 36 configured as a cloud-based storage system, other configurations are within the spirit and scope of the present invention. For example, storage management system 36 may comprise a single server or multiple networked servers in one or more physical locations.

Examples of content entities 38 include, but are not limited to, files, objects, data store records, data entries, containers, buckets, directories, and logical volumes and more. Each metadata entry 42 contains data entity attributes which include a content encryption key 44 and a retention time 46. Each metadata entry 42 may also store additional information (not shown) such as content type and creation date, and each content entity 38 has a corresponding metadata entry 42. In embodiments of the present invention, content entities 38 comprise encrypted data stored on storage management system 36, and each of the content entities can be encrypted and decrypted using its corresponding content encryption key 44.

In embodiments where metadata entries 38 are stored in storage management system 36, the metadata entries can be stored as encrypted data, as explained hereinbelow. By storing metadata entries 42 either as encrypted data on storage management system 36 or as encrypted or non-encrypted data on metadata management system 32, embodiments of the present invention can make a successful attack on facility 20 more difficult.

Each retention time 46 comprises a parameter that indicates a first time (i.e., date) that the corresponding content entity can be deleted from storage management system 36. In embodiments of the present invention, a given content entity 38 can be deleted from storage management system 36 by deleting its corresponding content encryption key 44. In some embodiments, a given content entity 38 may have one or more associated replicas 40 that are "hidden", as explained hereinbelow.

Gateway 30 comprises a gateway processor 50 and a gateway memory 52. In operation, processor 50 receives, from client computer 28, a request to access a given content entity 38. Using embodiments described herein, gateway 30 can retrieve the corresponding content encryption key 44, and store the retrieved encryption key to memory 52.

Metadata management system 32 comprises a metadata processor 54 and memory 48. Processor 54 is configured to generate content encryption keys 44, and to encrypt and decrypt the encryption keys using embodiments described hereinbelow. To generate, encrypt and decrypt a given content encryption key 44, processor 54 can use a metadata encryption key 56 stored in memory 48. Alternatively processor 54 can retrieve a master encryption key 58 from security management system 34, and use the master encryption key to generate, encrypt and decrypt the given content encryption key. Further operation of metadata management system 32 is described hereinbelow.

While the configuration in FIG. 1 shows a single metadata encryption key 56, memory 48 storing multiple metadata encryption keys 56 is considered to be within the spirit and scope of the present invention. In embodiments where memory 48 stores multiple metadata encryption keys 56, each metadata entry 42 (or each content encryption key 44 or each retention time 46) may have a respective metadata encryption key 56, and processor 60 can be configured to authorize deletion of a given metadata entry 42 (and its associated metadata encryption key 56) only upon a current time (i.e., date) being equal or greater than the metadata entry's retention time 46.

Security management system 34 comprises a secure processor 60, a secure clock 62 and a secure memory 64 that stores master encryption key 58. In some embodiments, processor 60 can securely validate an expiration of a given retention time 46 based on a current timestamp from clock 62 which cannot be tampered with due to access restrictions in high trust zone 24. In additional embodiments, processor 60 can use master encryption key 58 to generate a given content encryption key 44. In further embodiments, as described hereinbelow, processor 60 can use master encryption key 58 to encrypt/decrypt content encryption keys 44 and retention times 46, and can process requests to delete a given content encryption key 44. In supplemental embodiments, security management system 34 may comprise a trusted hardware module (e.g., a hardware security module) that is configured to prevent exposure of keys 44 and 59 to storage management system 36.

By validating the expiration of a given retention time 46 prior to the deleting a given content encryption key 44, processor 60 can help protect facility 20 protects from attacks on metadata management system 32 which may (a) attempt to erase content encryption keys 44, (b) tamper with the retention times 46, and (c) attempt to tamper with clock 62.

As described supra, facility 20 can store content encryption keys 44 and retention times 46 as encrypted data on storage management system 36. In these embodiments, content encryption keys 44 can be decrypted into decrypted content encryption keys 66, and retention times 46 can be decrypted into decrypted retention times 68, using embodiments described hereinbelow.

In some embodiments, processor 54 can ensure compliance with data retention requirements by creating and managing replicas 40 on storage management server 36. Each replica 40 comprises a copy of a given content entity 38 and its respective content encryption key 44 and retention time 46. In some embodiments, processor 54 can create and manage multiple replicas 40 for a given content entity 38. In embodiments herein, a given content entity 38 and its respective content encryption key 44 and retention time 46 may also be referred to as a primary dataset.

Metadata management system 32 can store replicas 40 in "hidden" locations on storage management system 36 that are kept secret from untrusted storage management system 36 and its users (i.e., the locations are known only to metadata management system 32). In the event of data corruption of a given primary dataset, metadata management system 32 can use the associated replica to restore the given primary dataset (i.e., the given content entity 38 and its respective content encryption key 44 and retention time 46). In embodiments of the present invention data corruption may comprise the data violating the retention time requirements (e.g., a deleted content encryption key 44). The "hidden replicas" are protected with same data protection mechanisms as the primary replicas In some embodiments, Metadata management system 32 may use a dedicated data entity encryption keys for each hidden replica 40. These dedicated keys can be deleted via the same data erasure mechanisms as the primary keys (i.e., the encryption key for the data entity), as described hereinbelow.

Metadata management system 32 can store the hidden locations as attributes (not shown) in metadata memory 48. In one embodiment, processor 54 can recalculate the hidden locations by applying of cryptographic functions (e.g. keyed-hash message authentication code, with keys stored in security management system 34) over certain attributes like a resource identifier or a uniform resource locator (URL). Processor 54 can store the keys and/or the cryptographic function in memory 64 (i.e., in security management system 34 in high trust zone 24), thereby preventing storage management system 36 from accessing and recalculating these locations.

In some embodiments, Metadata management system 32 can create replicas 40 as separate asynchronous operations, thereby preventing storage management system 36 from identifying their association with the original content entity 38. Additionally or alternatively, the given content entity 38 can be encrypted using probabilistic encryption which protects the given content entity from attacks that try to recognize the hidden copies by the comparison of their content to the original copies.

Processors 50, 54 and 60 typically comprise general-purpose computers, which are programmed in software to carry out the functions described herein. The software may be downloaded to systems 30, 32 and 34 in electronic form, over a network, for example, or it may be provided on non-transitory tangible media, such as optical, magnetic or electronic memory media. Alternatively, some or all of the functions of processor 50, 54 and 60 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Managing Distributed System Metadata

Figure 2:
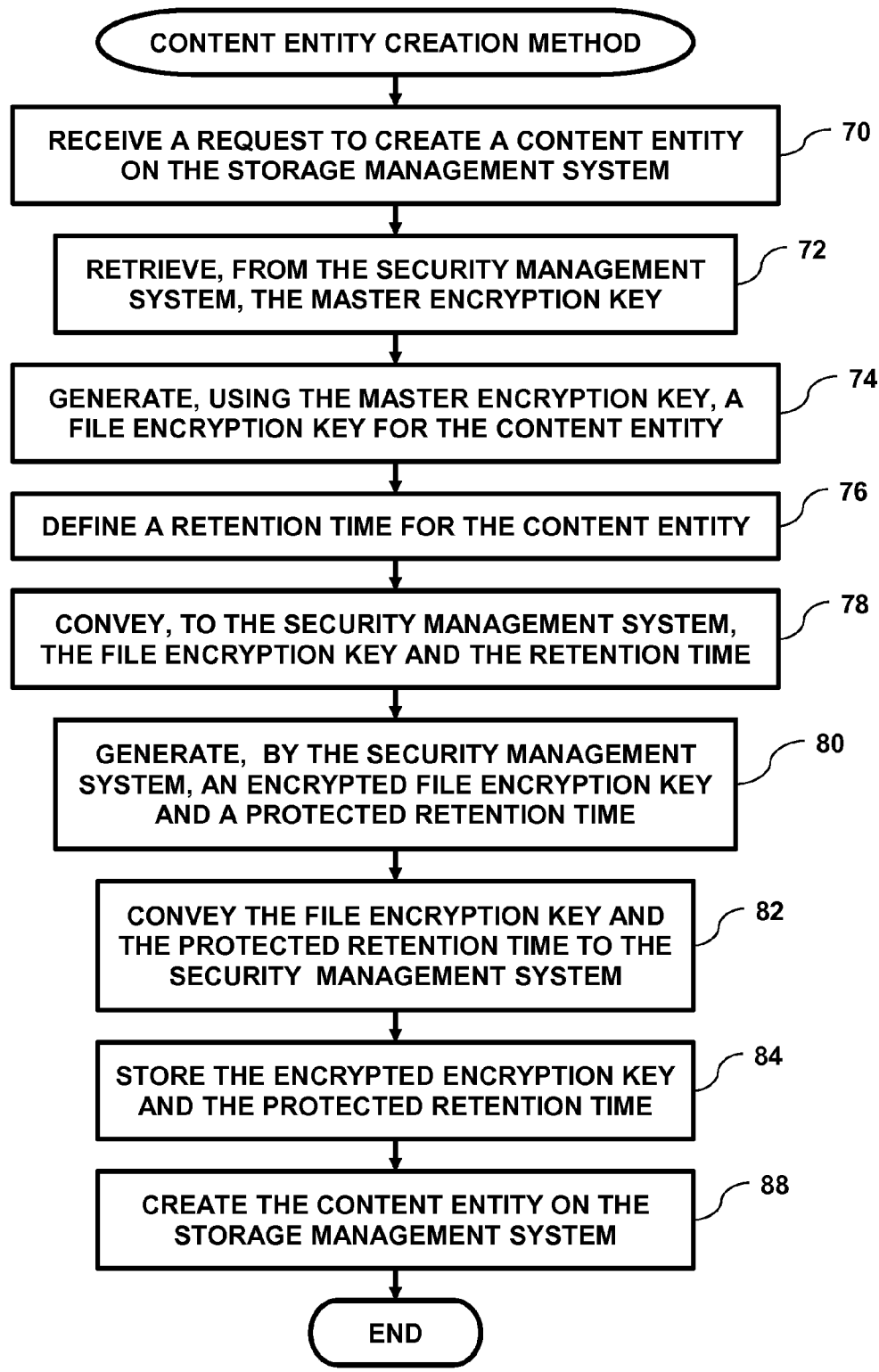
FIG. 2 is a flow diagram that schematically illustrates a method of creating a content entity having an encryption key, in accordance an embodiment of the present invention.

FIG. 2 is a flow diagram that describes a method of creating a given content entity 38, in accordance with an embodiment of the present invention. In a receive step 70, processor 54 receives a request to create the given content entity on storage management system 36. In some embodiments, client computer 28 conveys the content entity creation request to processor 50, and the gateway processor conveys the request to processor 54.

In a retrieval step 72, processor 54 retrieves, from security management system 34, master encryption key 58, and in a generation step 74, the metadata processor generates, using the master encryption key, a given content encryption key 44. In an alternative embodiment, upon receiving the content entity creation request, processor 54 can convey an encryption key generation request to security management system 34, and upon receiving the encryption key generation request, processor 60 can generate the given content encryption key, and convey the generated encryption key to metadata management system 32.

In a definition step 76, processor 54 defines a given retention time 46 for the given content entity. The defined retention time indicates an earliest date that the respective content encryption key can be deleted from facility 20. As described supra, the given content entity can be deleted by deleting its respective content encryption key 44. In other words, once its respective content encryption key 44 is deleted, data stored in the given content entity on storage management system 36 cannot be decrypted and storage space used by the given content entity can be reclaimed by storage management metadata management system 36.

In a first convey step 78, processor 54 conveys the generated content encryption key and the defined retention time to security management system 34. Upon receiving the generated content encryption key and the defined retention time, processor 60 can generate an encrypted content encryption key and a protected retention date in a generation step 80. In embodiments herein, retention times 46 that are stored in memory 48 or memory 64 may also be referred to as protected retention times.

To generate the encrypted content encryption key, processor 60 can encrypt, using master encryption key 58, the generated content encryption. In a first embodiment, processor can generate the protected retention time by using master encryption key 58 to encrypt the defined retention date. In a second embodiment, processor 60 can generate the protected retention date by calculating a signature for the defined retention date. In the second embodiment, the protected retention date comprises the defined retention date and the calculated signature.

In a second convey step 82, processor 60 conveys the encrypted content encryption key and the protected retention time to metadata management system 32. Upon receiving the encrypted content encryption key and the protected retention time, in a storing step 84 processor 54 can store the encrypted content encryption key and the protected retention time to a given metadata entry 42. As described supra, processor 54 can store the given metadata entry to storage management system 36 or to memory 48.

In an alternative embodiment, metadata management system 32 can perform the encryption and protection described in step 80. In this alternative embodiment, processor 54 can, using metadata encryption key 56, encrypt the generated content encryption key and the defined retention time (or calculate the signature). In a further embodiment, processor 54 can store the generated content encryption key and the defined retention time as unencrypted (i.e., unprotected) data in memory 48. In some embodiments, metadata management system 32 can encrypt the additional information (e.g., content type) in metadata entries 42 using embodiments described herein.

As described in embodiments hereinabove, the encrypted content encryption key and the protected retention time can be generated by either metadata management system 32 or security management system 34. Since metadata management system 32 and security management system 34 are in different trust zones, systems 32 and 34 can provide different levels of protection against unauthorized modification of metadata entries 42.

Finally, in a creation step 86, processor 54 can create the given content entity by conveying a request to storage management system 36, and the method ends. Upon receiving the request from processor 54 and creating the content entity, storage management system 36 can convey a confirmation to metadata management system 32.

Figure 3:
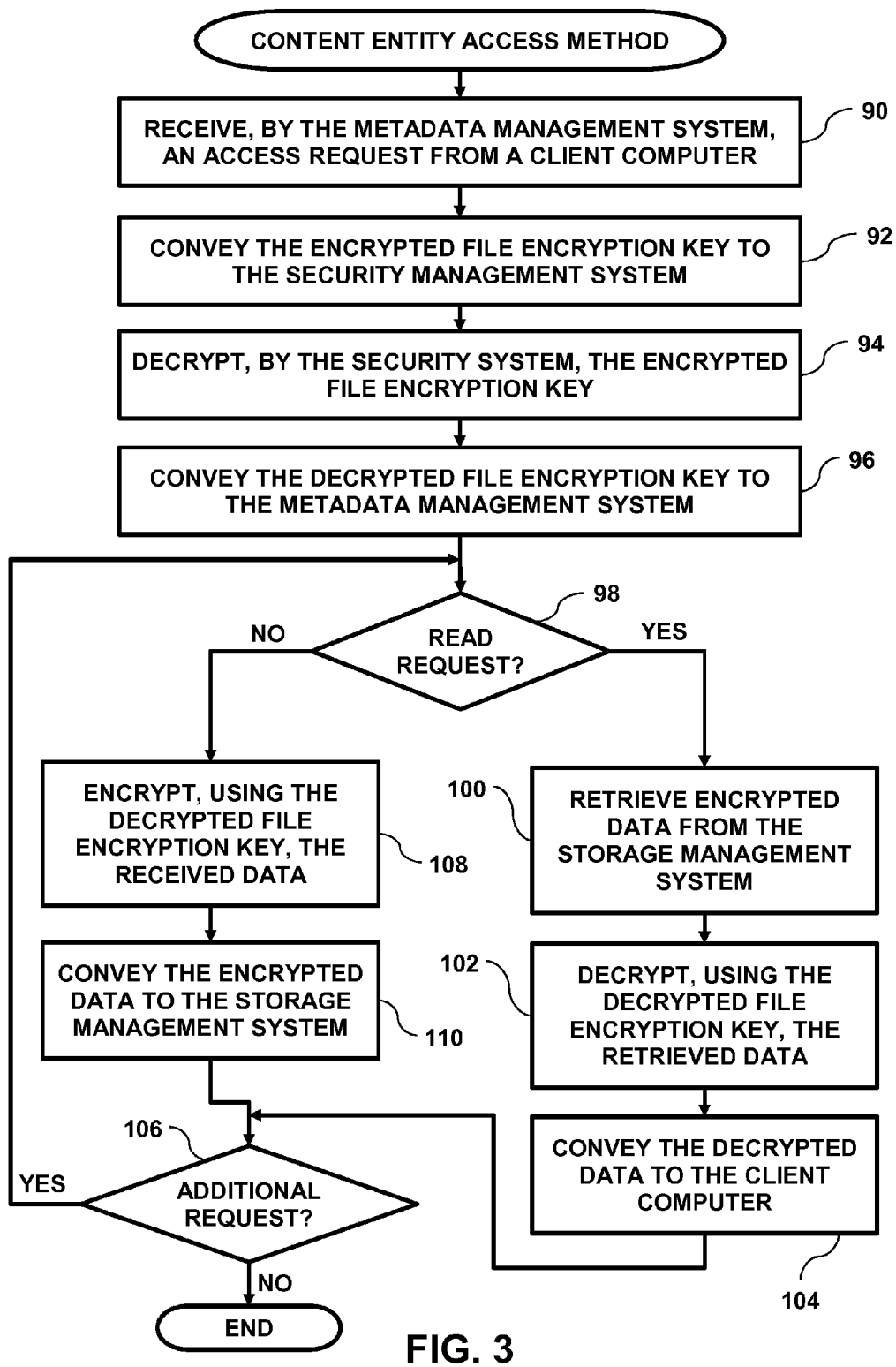
FIG. 3 is a flow diagram that schematically illustrates a method of accessing the content entity, in accordance an embodiment of the present invention.

FIG. 3 is a flow diagram that describes a method of accessing a given content entity 38, in accordance with an embodiment of the present invention. Accessing the given content entity typically comprises reading data from the given content entity or writing data to the given content entity.

In a receive step 90, processor 54 receives a data access request from client computer 28 via gateway 30, and in a first convey step 92, the metadata processor conveys, to security management system 34, the respective content encryption key for the given content entity. As described supra, processor 54 may store content encryption keys 44 as encrypted data. In these embodiments, upon receiving the respective content encryption key, processor 60 can use master encryption key 58 to decrypt the respective content encryption key into decrypted key 66 in a decryption step 94, and convey the decrypted key to metadata management system 32 in a second convey step 96. In embodiments where metadata entries 42 stores additional encrypted information (e.g., content type), metadata management system 32 can use embodiments described hereinabove to decrypt the additional information, and use the decrypted additional information to access the given content entity.

As described supra in the description referencing FIG. 2, the respective content encryption key may have been encrypted by processor 54 using metadata encryption key 56. Therefore, if the respective content encryption key was encrypted by processor 54 then the metadata processor use metadata encryption key 56 to decrypt the respective content encryption key into decrypted key 66 in step 94. In embodiments where processor 54 stores content encryption keys 44 in memory 48 as unencrypted data, decrypted key 66 comprises the respective content encryption key 44 and steps 92-96 can be skipped.

The received content entity access request typically comprises a read request or a write request. In a first comparison step 98, if the received request comprises a read request, then processor 54 retrieves encrypted data from the given content entity on storage management system 36 in a retrieval step 100, decrypts the retrieved encrypted data using the decrypted key 66 in a decryption step 102, and conveys the decrypted data to client computer 28 via gateway 30 in a second convey step 104.

In a second comparison step 106, if processor 54 receives an additional access request for the given content entity, then the method continues with step 98. If there are no further access requests for the given content entity, then the method ends.

Returning to step 98, if the received request comprises a write request comprising write request data, then in an encryption step 108, processor 54 encrypts the write request data using decrypted key 66. In a third convey step 110, processor 54 conveys the encrypted write request data to the given content entity on storage management system 36, and the method continues with step 104

While steps 98-110 described in the flow diagram describe metadata management system 32 processing the read/write requests for the given content entity, the steps may be performed by gateway 30. In the configuration shown in FIG. 1, processor 54 can convey the decrypted key 66 to gateway 30, and gateway 30 can use the decrypted key to process read/write requests for the given content entity using embodiments described herein.

Figure 4:
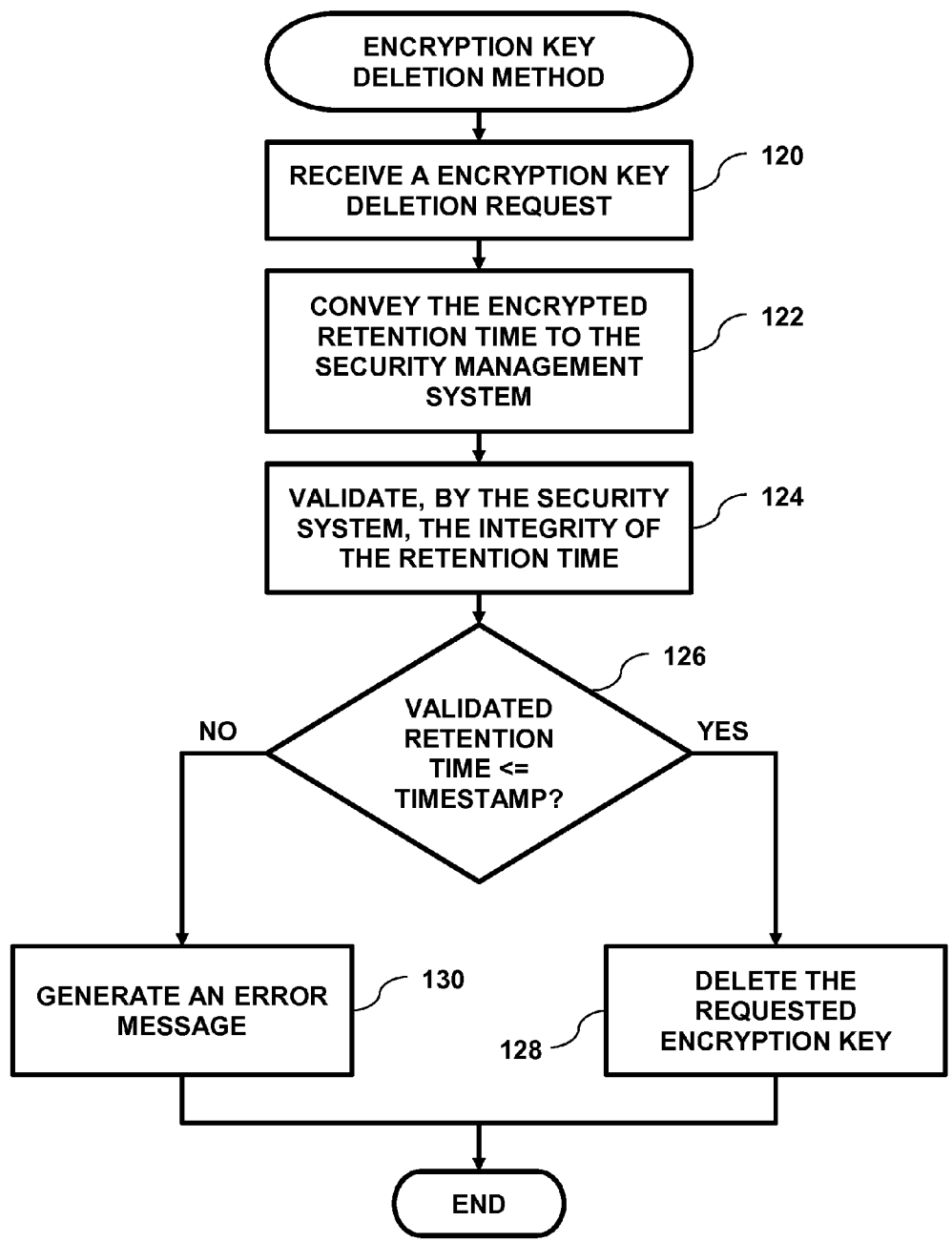
FIG. 4 is a flow diagram that schematically illustrates a method of deleting the encryption key, in accordance an embodiment of the present invention.

FIG. 4 is a flow diagram that describes a method for deleting a given content encryption key 44, in accordance with an embodiment of the present invention. In a receive step 120, processor 54 receives, from client computer 28 via gateway 30, a request to delete a given content encryption key 44. In embodiments of the present invention as described supra, the given content encryption key may be stored in metadata management system 32 or storage management system 36.

In a convey step 122, processor 54 conveys, to security management system 34, a validation request comprising the respective retention time for the given content entity. In a decryption step 124, upon receiving the validation request, processor 60 can validate the integrity of the respective retention time. In some embodiments, processor 60 can validate the integrity of the respective retention time use master encryption key 58 to decrypt the respective retention time into decrypted time 68.

In an alternative embodiment, as described supra in the description referencing FIG. 2, the respective retention time may have been encrypted by processor 54 using metadata encryption key 56. Therefore, if the respective retention time was encrypted by processor 54 then in step 126, the metadata processor can use the metadata encryption key to decrypt the respective retention time into decrypted time 68 and convey the validation request comprising decrypted time 68. In embodiments where processor 54 stores retention times 46 in memory 48 as unencrypted data, decrypted time 68 comprises the respective encryption time 46 and step 124 can be skipped.

In a comparison step 126, processor 60 determines whether or not the given content encryption key is eligible for deletion be obtaining a current timestamp from clock 62 and checking if decrypted time 68 is less than or equal to the current timestamp. Additionally or alternatively, processor 60 may validate the integrity of the respective retention time by performing integrity checks on decrypted time 68 such as a verifying the decrypted time's signature (e.g., a hash value calculated using a one-way function). Therefore, in embodiments of the present invention, verifying that the given content encryption key is eligible for deletion may also comprise performing one or more integrity checks.

If processor 60 verifies that the given content encryption key is eligible for deletion, then the secure processor conveys an authorization message to metadata management system 32 indicating that the given content encryption key is eligible for deletion. However, if the given content encryption key fails the verification test, then processor 60 conveys a fail message to metadata management system 32 indicating that the given content encryption key is not eligible for deletion.

If processor 54 receives the authorization message, the metadata processor deletes the metadata entry storing the given content encryption key in a deletion step 128, and the method ends. In embodiments where the given content entity has one or more hidden replicas 40, processor 54 also deletes any content encryption keys dedicated to (i.e., associated with) the one or more hidden replicas. In embodiments where the given content encryption key has a respective metadata encryption key 56, processor 54 deletes the respective metadata encryption key in step 128. If processor 54 receives the fail message, then in a notification step 130, the metadata processor generates an error message, and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computing facility, comprising:
   a storage management system belonging to a first trust zone having a first privilege level and configured to store multiple content entities;
   a metadata management system belonging to a second trust zone having a second privilege level higher than the first privilege level and configured:
   to store, for the multiple content entities, respective content encryption keys and respective protected retention dates,
   to process write requests to store data to a given content entity by encrypting the data in the write request, using the respective content encryption key of the given content entity, and storing the encrypted data to the given content entity, and
   to process read requests for data stored in the given content entity by retrieving the requested data from the given content entity, and decrypting, using the respective content encryption key, the retrieved encrypted data; and
   a security management system belonging to a third trust zone having a third privilege level higher than the second privilege level and comprising a secure clock and configured:
   to receive, from the metadata management system, protected retention dates,
   to compare the received protected retention dates to a current time of the secure clock, and
   to convey an authorization message to the metadata management system for the received protected retention dates greater than or equal to the current time;
   wherein, the metadata management system is further configured, upon receiving a request to delete one of the content entities from the storage system, to convey the corresponding protected retention date to the security management system,
   and to delete the one of the content entities only upon receiving an authorization message from the secure management system.

2. The computing facility according to claim 1, wherein each of the multiple content entities is selected from a list consisting of a file, and object, a data store record, a data entry, a container, a bucket, a directory, a logical volume, and an object.

3. The computing facility according to claim 1, wherein the respective content encryption key comprises an encrypted content encryption key, wherein the metadata management system is configured to encrypt the data in the write request by decrypting the encrypted content encryption key into a decrypted content encryption key, and encrypting, using the decrypted content encryption key, the data in the write request, and wherein the metadata management system is configured to decrypt the retrieved encrypted data by decrypting the encrypted content encryption key into the decrypted content encryption key, and decrypting, using the decrypted content encryption key, the retrieved encrypted data.

4. The computing facility according to claim 3, wherein the security management system comprises a memory configured to store a master encryption key, and wherein the security system is configured to compare the received protected retention dates to a current time of the secure clock by decrypting, using the master encryption key, the received protected retention dates into decrypted retention dates, and comparing the decrypted retention dates to a current time of the secure clock.

5. The computing facility according to claim 1, wherein prior to comparing the protected retention dates to a current time of the secure clock, the security management system is configured to calculate signatures for the received protected retention dates, to verify the calculated signatures.

6. The computing facility according to claim 1, wherein the metadata management system comprises a processor configured to store the respective content encryption keys and the respective protected retention dates, to process the write requests, to process the read requests, to convey the corresponding protected retention date, and to delete the given content entity.

7. The computing facility according to claim 1, wherein the security management comprises a processor configured to receive the protected retention dates, to compare the protected retention dates, and to convey the authorization message.

8. The computing facility according to claim 1, wherein the metadata management system comprises a virtual machine.

9. The computing facility according to claim 1, wherein the security management comprises a virtual machine.

10. The computing facility according to claim 1, wherein storing the encrypted content encryption keys and the protected retention dates comprises storing the encrypted content encryption keys and the protected retention dates to the storage management system.

11. The computing facility according to claim 1, wherein the metadata system comprises a memory, and wherein storing the encrypted content encryption keys and the protected retention dates comprises storing the encrypted content encryption keys and the protected retention dates to the memory of the metadata system.

12. The computing facility according to claim 1, wherein the metadata processor is configured to receive a request to delete the given content entity by receiving a request to delete the respective protected content encryption key.

13. A method, comprising:
storing, by a storage management system belonging to a first trust zone having a first privilege level, multiple data entities;
storing, by a metadata management system belonging to a second trust zone having a second privilege level higher than the first privilege level, respective file encryption keys and respective protected retention times for the multiple content entities;
processing, by the metadata management system, write requests to store data to a given content entity by encrypting the data in the write request, using the respective content encryption key of the content given entity, and storing the encrypted data to the given content entity, and
processing, by the metadata management system, read requests for data stored in a given content entity, by retrieving the requested data from the given content entity, and decrypting, using the respective content encryption key, the retrieved encrypted data;
upon receiving, by the metadata management system, a request to delete one of the content entities from the storage system, conveying, by the metadata management system, the corresponding protected retention date to a security management system belonging to a third trust zone having a third privilege level higher than the second privilege level and comprising a secure clock;
receiving, by the security management system, the conveyed protected retention date;
conveying, by the security management system, an authorization message to the metadata management system upon determining that the received protected retention date is greater than or equal to a current time of the secure clock; and
deleting, by the metadata management system, the one of the content entities only upon receiving the authorization message from the security management system.

14. A computer program product, the computer program product comprising:
a non-transitory computer readable storage medium having computer readable program code embodied therewith, the computer readable program code comprising:
computer readable program code configured to store, by a storage management system belonging to a first trust zone having a first privilege level, multiple data entities;
computer readable program code configured to store, by a metadata management system belonging to a second trust zone having a second privilege level higher than the first privilege level, respective file encryption keys and respective protected retention dates for the multiple content entities;
computer readable program code configured to process, by the metadata management system, write requests to store data to a given content entity by encrypting the data in the write request, using the respective content encryption key of the given content entity, and storing the encrypted data to the given content entity;
computer readable program code configured to process, by the metadata management system, read requests for data stored in a given content entity, by retrieving the requested data from the given content entity, and decrypting, using the respective content encryption key, the retrieved encrypted data;
upon receiving, by the metadata management system, a request to delete one of the content entities from the storage system, computer readable program code configured to convey, by the metadata management system, the corresponding protected retention date to a security management system belonging to a third trust zone having a third privilege level higher than to the second privilege level and comprising a secure clock;

computer readable program code configured to receive, by the security management system, the conveyed protected retention date;

computer readable program code configured to convey, by the security management system, an authorization message to the metadata management system upon determining that the received protected retention date is greater than or equal to a current time of the secure clock; and computer readable program code configured to delete, by the metadata management system, the one of the content entities only upon receiving the authorization message from the security management.

* * * * *